US011321340B1

(12) United States Patent
Brown et al.

(10) Patent No.: US 11,321,340 B1
(45) Date of Patent: May 3, 2022

(54) METADATA EXTRACTION FROM BIG DATA SOURCES

(71) Applicant: Wells Fargo Bank, N.A., San Francisco, CA (US)

(72) Inventors: Andrew Brown, Huntersville, NC (US); Dale E. Prillaman, Sneads Ferry, NC (US); David Leblanc, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 19 days.

(21) Appl. No.: 16/836,232

(22) Filed: Mar. 31, 2020

(51) Int. Cl.
*G06F 17/00* (2019.01)
*G06F 16/25* (2019.01)

(52) U.S. Cl.
CPC ................... *G06F 16/254* (2019.01)

(58) Field of Classification Search
CPC ........ G06F 16/13; G06F 16/24; G06F 16/156; G06F 16/254; G06N 3/00; G06N 5/00; G05B 13/00
See application file for complete search history.

(56) References Cited

U.S. PATENT DOCUMENTS

| | | | |
|---|---|---|---|
| 7,788,213 B2 | 8/2010 | Friedlander et al. | |
| 8,266,185 B2 | 9/2012 | Raichelgauz et al. | |
| 8,468,244 B2 | 6/2013 | Redlich et al. | |
| 9,081,829 B2 | 7/2015 | Bhave et al. | |
| 9,081,834 B2 | 7/2015 | Bhave et al. | |
| 9,323,802 B2 | 4/2016 | Gould et al. | |
| 10,191,974 B2 | 1/2019 | Indeck et al. | |
| 10,268,645 B2 | 4/2019 | Vaitheeswaran et al. | |
| 10,321,167 B1 | 6/2019 | Edell et al. | |
| 10,325,272 B2 | 6/2019 | Hunt et al. | |
| 10,360,252 B1 | 7/2019 | Kraytem et al. | |
| 10,417,289 B2 | 9/2019 | Imbruce et al. | |
| 10,437,848 B2 | 10/2019 | Agarwal et al. | |
| 10,452,661 B2 | 10/2019 | Bernstein et al. | |
| 10,474,668 B2 | 11/2019 | Bensberg et al. | |
| 10,740,324 B1* | 8/2020 | Pandari | G06F 16/24561 |
| 2017/0053242 A1* | 2/2017 | Ayyaswami | G06Q 10/103 |
| 2017/0116295 A1 | 4/2017 | Wan et al. | |
| 2017/0132866 A1* | 5/2017 | Kuklinski | G06F 21/44 |
| 2017/0177309 A1* | 6/2017 | Bar-Or | G06F 8/34 |
| 2018/0095952 A1 | 4/2018 | Rehal | |
| 2018/0096000 A1 | 4/2018 | Harrison et al. | |
| 2018/0096001 A1 | 4/2018 | Soza | |
| 2018/0144067 A1 | 5/2018 | Chatelain et al. | |
| 2018/0173812 A1* | 6/2018 | Agarwal | G06F 16/254 |

(Continued)

OTHER PUBLICATIONS

Eassa et al., "An Architecture for Metadata Extractor of Big Data in Cloud Systems," International Journal of Scientific & Engineering Research, vol. 5, Issue 1, Jan. 2014, 5 pages.

(Continued)

*Primary Examiner* — Hung D Le
(74) *Attorney, Agent, or Firm* — Merchant & Gould P.C.

(57) ABSTRACT

An example system for programmatically extracting data from a big data source includes: a processor; and system memory encoding instructions which, when executed by the processor, cause the system to: extract metadata from the big data source using the utility; transform the metadata into a standard format; and load the metadata in a repository.

10 Claims, 7 Drawing Sheets

(56) References Cited

U.S. PATENT DOCUMENTS

| | | | |
|---|---|---|---|
| 2018/0285418 A1 | 10/2018 | Petropoulos et al. | |
| 2018/0336228 A1 | 11/2018 | Krog Iverson | |
| 2019/0138654 A1 | 5/2019 | Arora et al. | |
| 2019/0171427 A1* | 6/2019 | Singh | G06F 8/77 |
| 2019/0180325 A1* | 6/2019 | Carrasco | G06F 16/9535 |
| 2019/0236149 A1 | 8/2019 | Kuruvada et al. | |
| 2019/0279101 A1* | 9/2019 | Habti | G06F 16/221 |
| 2019/0303509 A1 | 10/2019 | Greene | |
| 2020/0104291 A1* | 4/2020 | Villacres | G06F 16/2358 |
| 2020/0125566 A1* | 4/2020 | Scott | G06F 16/24535 |
| 2020/0314437 A1* | 10/2020 | Smole | G06N 20/00 |
| 2021/0004350 A1* | 1/2021 | Sundaramoorthy | G06F 16/116 |
| 2021/0117868 A1* | 4/2021 | Sriharsha | G06N 20/00 |

OTHER PUBLICATIONS

Williams et al., "Scholarly Big Data Information Extraction and Integration in the CiteSeer Digital Library," Intformation Sciences and Technology, Computer Science and Engineering, Pennsylvania State University, 2014, 6 pages.

Hai et al., "Constance: An Intelligent Data Lake System," https://www.researchgate.net/publication/304021718, Conference Paper—Jun. 2016, 5 pages.

Bratt et al., "Big Data, Big Metadata, and Quantitative Study of Science: A workflow model for big scientometics," Oct. 24, 2017, https://doi.org/10.1002/pra2.2017.14505401005, 2 pages.

* cited by examiner

METADATA EXTRACTION FROM BIG DATA SOURCES

BACKGROUND

Databases store "data about the data", which is referred to as metadata. Much of the data that is consumed (such as a value on a report) comes from multiple "upstream systems". Metadata helps connect these systems together. Understanding the metadata of upstream systems is critical in validating the logic and accuracy of "downstream data". The volume, complexity and changing nature of metadata makes it difficult to maintain.

SUMMARY

Embodiments of the disclosure are directed to an example system for programmatically extracting data from a big data source includes: a processor; and system memory encoding instructions which, when executed by the processor, cause the system to: extract metadata from the big data source using the utility; transform the metadata into a standard format; and load the metadata in a repository.

The details of one or more techniques are set forth in the accompanying drawings and the description below. Other features, objects, and advantages of these techniques will be apparent from the description, drawings, and claims.

DETAILED DESCRIPTION

The present disclosure is directed to the programmatic extraction of metadata from big data sources.

Metadata is "data about data" and provides the information that connects systems together. This is especially true in big data sources, where the metadata provides the information necessary to understand the data, particularly from where upstream the data came.

The present disclosure provides for the programmatic extraction of metadata from big, unstructured or semi-structured data sources. Examples of such big data sources include: MongoDB from MongoDB, Inc. of New York City, N.Y.; Splunk Enterprise from Splunk Inc. of San Francisco, Calif.; and Hadoop from The Apache Software Foundation of Wakefield, Mass. Other big data sources can be used.

In examples described herein, a script or tool is configured to run on a big data source to extract a dataset including the metadata. The extracted metadata is named or otherwise organized into directories that identify from where the data originated (i.e., import feed).

A metadata management server can receive and store the extracted metadata. One example of such a metadata management server is the Ab Initio Metadata System (including the Ab Initio Metadata Hub) from Ab Initio Software LLC of Lexington, Mass. Other systems can be used.

This metadata extraction capability improves the system's ability to understand the data: where data is coming from; where it is going; and/or what happens to the data along the way. Potential beneficiaries include: technology groups; compliance; regulators, line-of-business reporting; etc.

For example, some reports contain data that has passed through many (e.g., five-plus) upstream systems. With automation, this knowledge can be programmatically captured and shared with a wide variety of audiences. This lineage involves understanding where data comes from across multiple systems.

Figure 1:
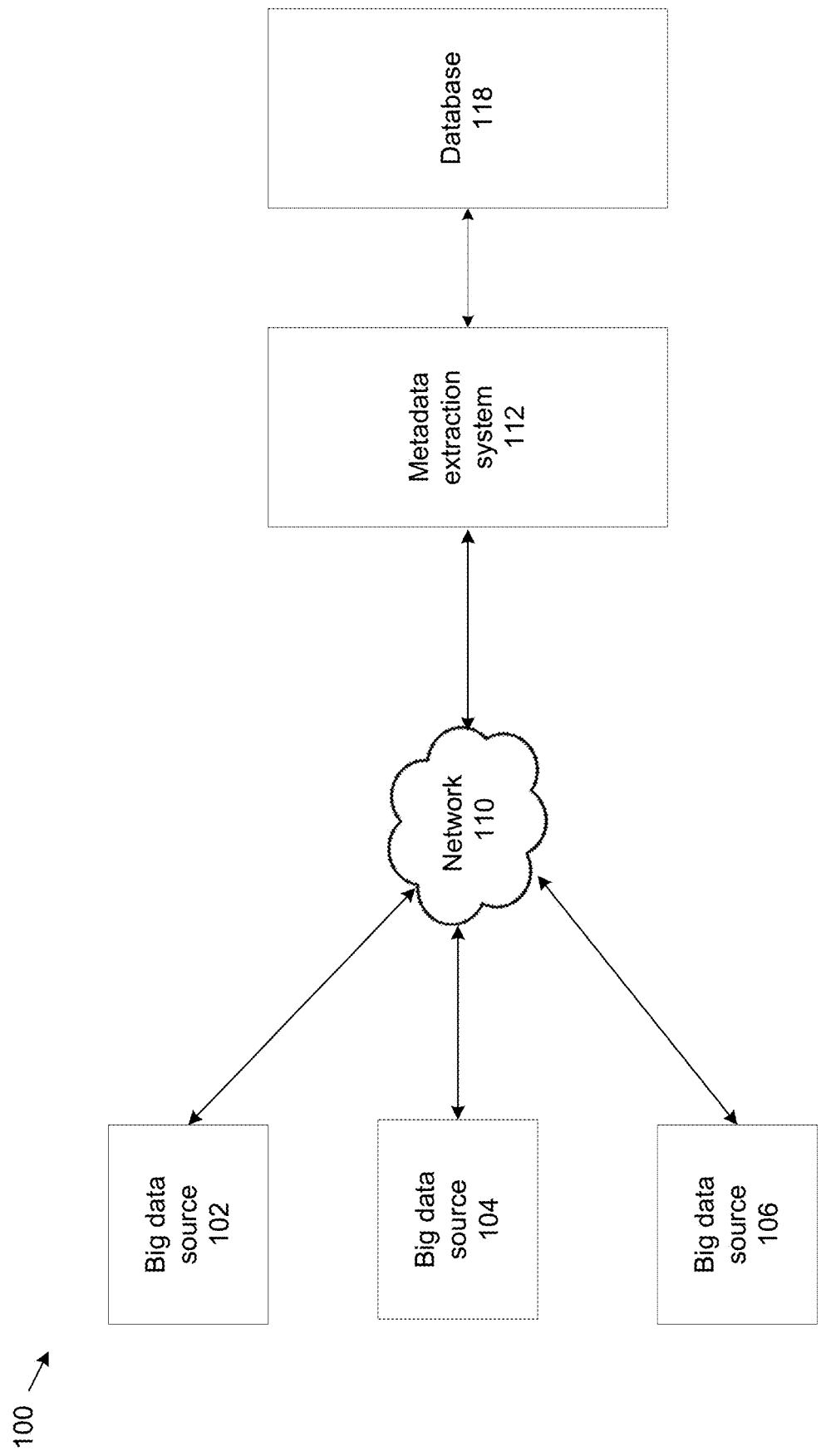
FIG. 1 shows an example system that provides for the programmatic extraction of metadata from big data sources.
Figure 2:
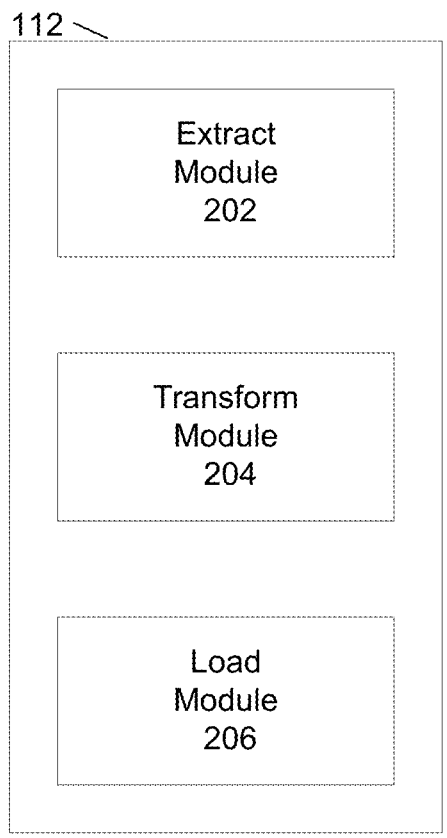
FIG. 2 shows example logical components of the system of the system of FIG. 1.
Figure 3:
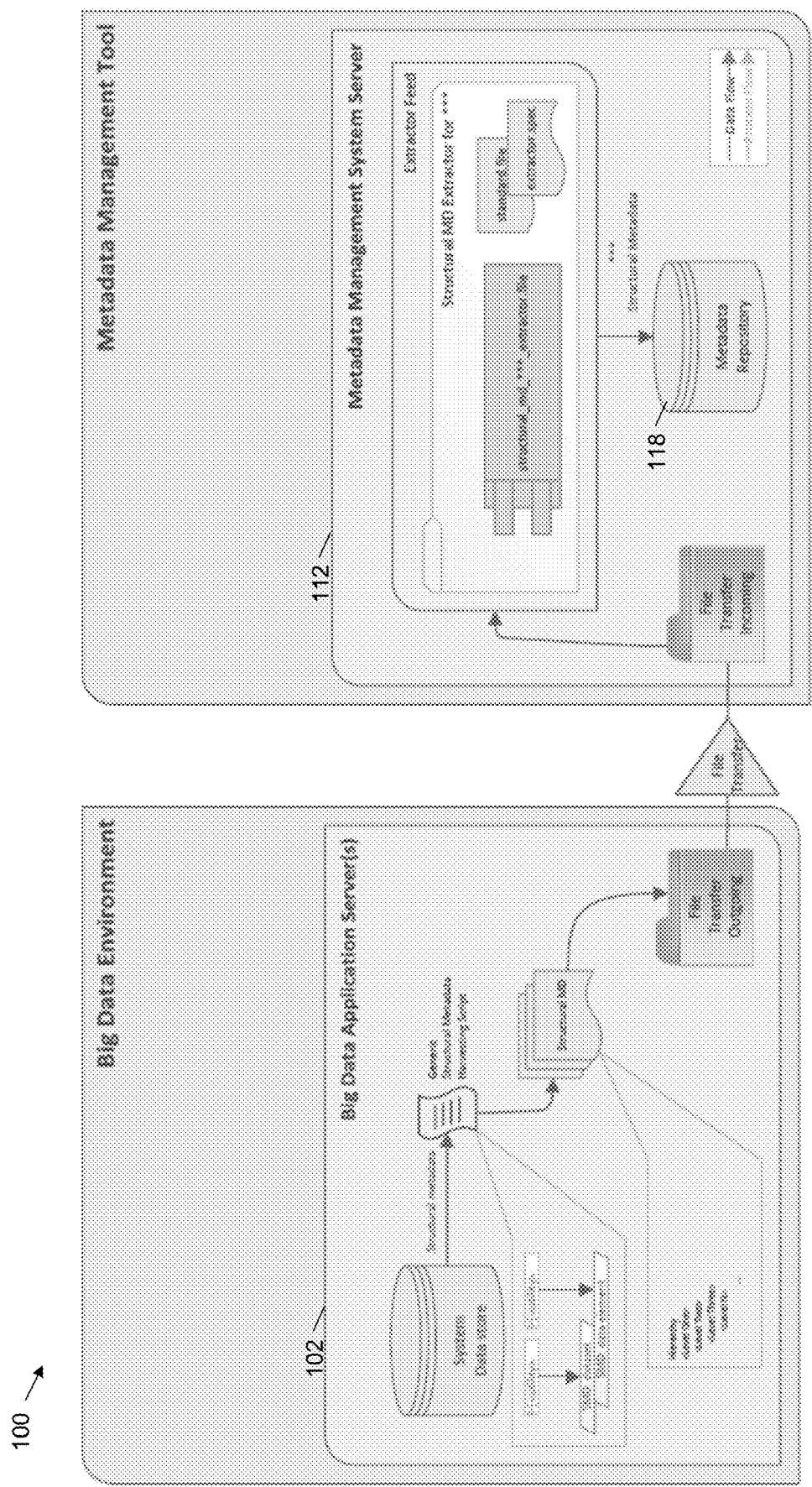
FIG. 3 shows additional example details of the system of FIG. 1.

FIGS. 1-3 shows an example system 100 that can provide for the programmatic extraction of metadata from big data sources. System 100 includes big data sources 102, 104, 106 (e.g., MongoDB, Splunk, Hadoop, etc.), a network 110, a metadata extraction device 112, and a database 118. More, fewer, or different components are possible.

In this example, the big data sources 102, 104, 106 are big, unstructured or semi-structured data sources. The big data sources 102, 104, 106 can house information associated with customers and financial transactions for a financial organization (e.g., a bank) having a plurality of customers. However, many other types of data can also be used.

The example network 110 is a computing device network that may include the Internet, private networks, and a combination thereof. In some arrangements, the network 110 includes wired and/or wireless networks. The metadata extraction device 112 communicates with the big data sources 102, 104, 106 using network 110.

The metadata extraction device 112 includes one or more computing devices that are programmed to programmatic extract metadata from the big data sources 102, 104, 106. Information from the metadata extraction device 112 is stored in the database 118. For instance, the database 118 can include the Ab Initio Metadata Hub from Ab Initio Software LLC, although other configurations are possible.

Referring now to FIG. 2, additional details of the metadata extraction device 112 are shown. The metadata extraction device 112 can logically be broken into three components: an extract module 202; a transform module 204; and a load module 206.

The extract module 202 is programmed to extract metadata from one or more of the big data sources 102, 104, 106. The extract module 202 includes an import feed that defines what metadata to import and how to do so. The extract module 202 includes the location of the big data sources 102, 104, 106 to be imported and related parameters, as well as the name of the import rule and data source connection to be used.

The transform module 204 transforms metadata into a different (e.g., hub-friendly format for the database 118). The transform module 204 includes import rules that specify mappings and transformations to be performed on the metadata being extracted, as well as loading instructions, such that it can be mapped to a specific data model (e.g., Ab Initio's data model).

For example, an import rule can map a path in a technical repository to a source path in the database 118. Another import rule can change underscores in a source to spaces in the database 118. An import rule names the import extractor to be used.

The load module 206 loads the extracted and transformed metadata into the database 118. An import extractor reads metadata from its source and converts it to a format that the import process understands. In some examples, the metadata is first loaded by the load module 206 into a changeset, a temporary location (staging area) in the database 118. The changeset records the proposed additions, deletions, and modifications. The changeset can be reviewed, approved, then becomes available within the database 118.

The metadata extraction device 112 thereby provides a detailed understanding of the data structures from the big data sources 102, 104, 106, including one or more of: schemas, tables, columns, executables, lineage, relationships, etc.

Figure 4:
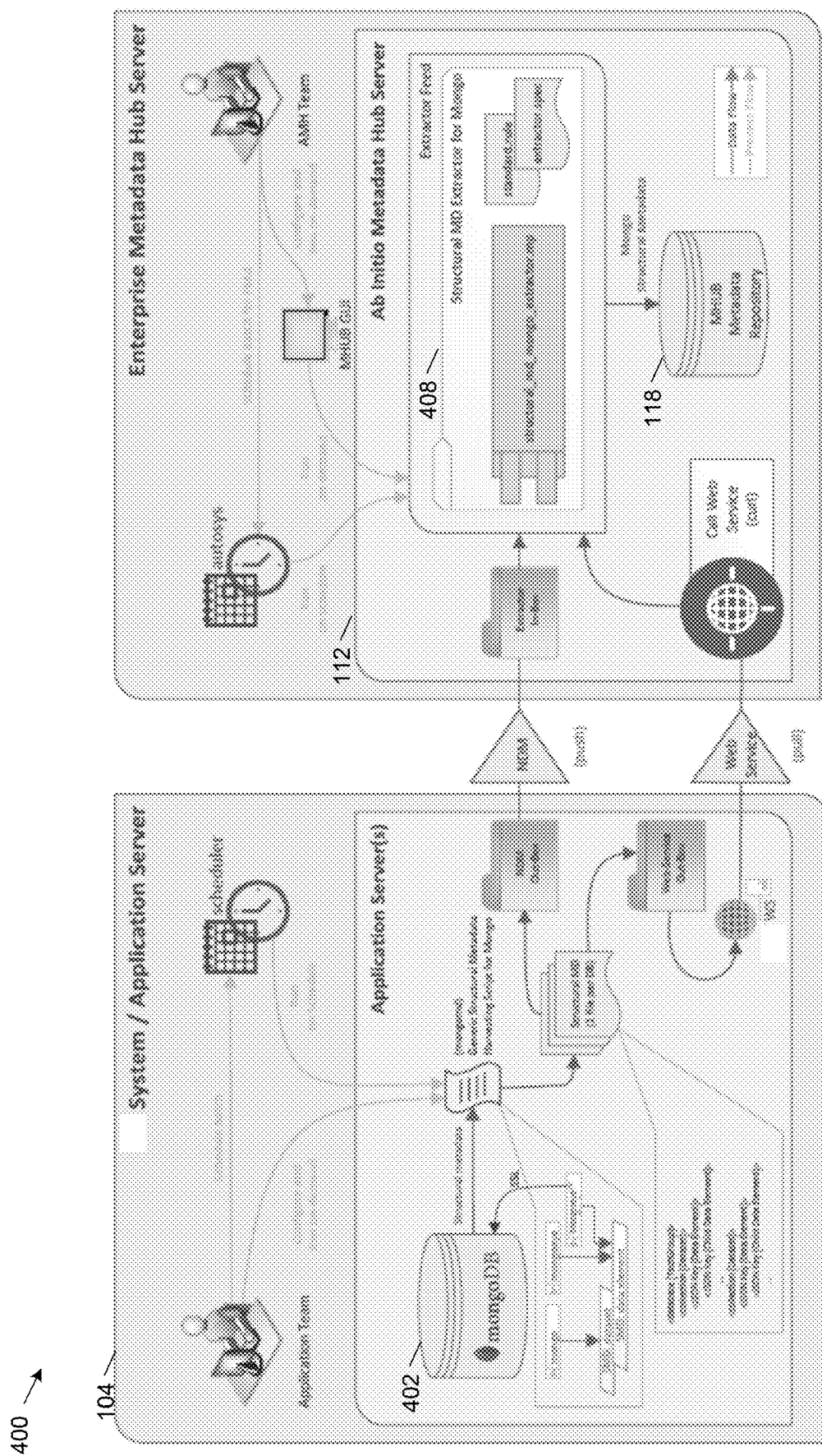
FIG. 4 shows additional example details of another embodiment of the system of FIG. 1.

Referring now to FIG. 4, an example system 400 for the programmatic extraction of the metadata from the big data source 104 is shown. In this example, the big data source 104 is a MongoDB big data source. The metadata extraction device 112 is programmed to extract the relevant metadata information from the MongoDB big data source.

More specifically, the data of the big data source 104 is stored in a database 402. This data can be unstructured or semi-structured. The metadata extraction device 112 includes an extraction module 408. The extraction module 408 uses a custom script to invoke functionality associated with the database 402.

In this instance, the metadata extraction device 112 uses a utility associated with the database 402 (i.e., the Mongo-Eye utility) to interact with the big data source 104 to extract the metadata. The custom script invokes the MongoEye utility to extract the metadata. This can include a determination of the data store name and size, definition of a sampling clause (the utility takes samples of the unstructured data to determine valid metadata while limiting performance impacts), and identification of an output file. One non-limiting example of such a custom script is provided below.

```
emptyCollectionsStr="
for collection in ${ProcCollectionsArr[@]}
do
Prepare collection name and get collection size
coltn=$(echo ${collection}|tr –d '\"')
coltnDocCnt=$(fx_getDocCnt ${coltn})
fx_debug collection coltn coltnDocCnt ## DEBUGGING ##
Set Sampling Clause
coltnSamplingClause="$(fx_setSamplingClause
    ${SAMPLE_TYPE}
${SAMPLE_SIZE} ${coltnDocCnt})"
fx_debug coltnSamplingClause ## DEBUGGING ##
Send metadata to the OUTPUT_FILE (dataset and data
    element)
if ((${coltnDocCnt}>0))
then
Send dataset and data element metadata
echo    "Collection/Dataset:    (${coltn})-->Documents
    (${coltnDocCnt})-->Elements"
${MONGOEYE_COMMAND}    ${coltnSam-
    plingClause}--col ${coltn}>>
${OUTPUT_FILE}
echo>>${OUTPUT_FILE}
echo "_EOF_">>${OUTPUT_FILE}
else
Send only dataset metadata (empty collection)
##echo    "Collection/Dataset:    (${coltn})-->Documents
    (none)"
fx_prepEmptyCollection "${MONGO_DB_NAME}"--
    col "${coltn}">>
${OUTPUT_FILE}
Capture list of empty collections
emptyCollectionsStr="${emptyCollectionsStr} ${coltn}
done
```

The metadata extraction device 112 then transforms the data, which includes naming and organizing the metadata in such a way that the data can be stored in and accessed from the database 118. The transformation includes moving the extract metadata to a standard format, such as a JavaScript Object Notation (JSON) format.

The metadata extraction device 112 then loads the metadata into the database 118. Initially, a change set is created, reviewed and approved using functionality provided by Ab Initio. Finally, the metadata is published in the database 118 for viewing.

The result is a detailed understanding of the data structures from the big data source 104, including: Mongo database names, collections, and/or JSON Keys. One non-limiting example of the collected metadata is provided in the table below. The hierarchical structure includes: database name, collection, and JSON key.

| Type of metadata | Value extracted from Mongo-based Application | Native Type (Descriptor for keys) |
| --- | --- | --- |
| Application | GenericApplication | n/a |
| Database name | GenericApplication_DB | n/a |
| Collection* | GenericCollection | |
| JSON Key | _id | Object id 38%, string 61% |
| JSON Key | Addedtowatchlist | Date |
| JSON Key | Assessment_check | Array 16%, object 83% |
| JSON Key | Generic_ID | string |

Figure 5:
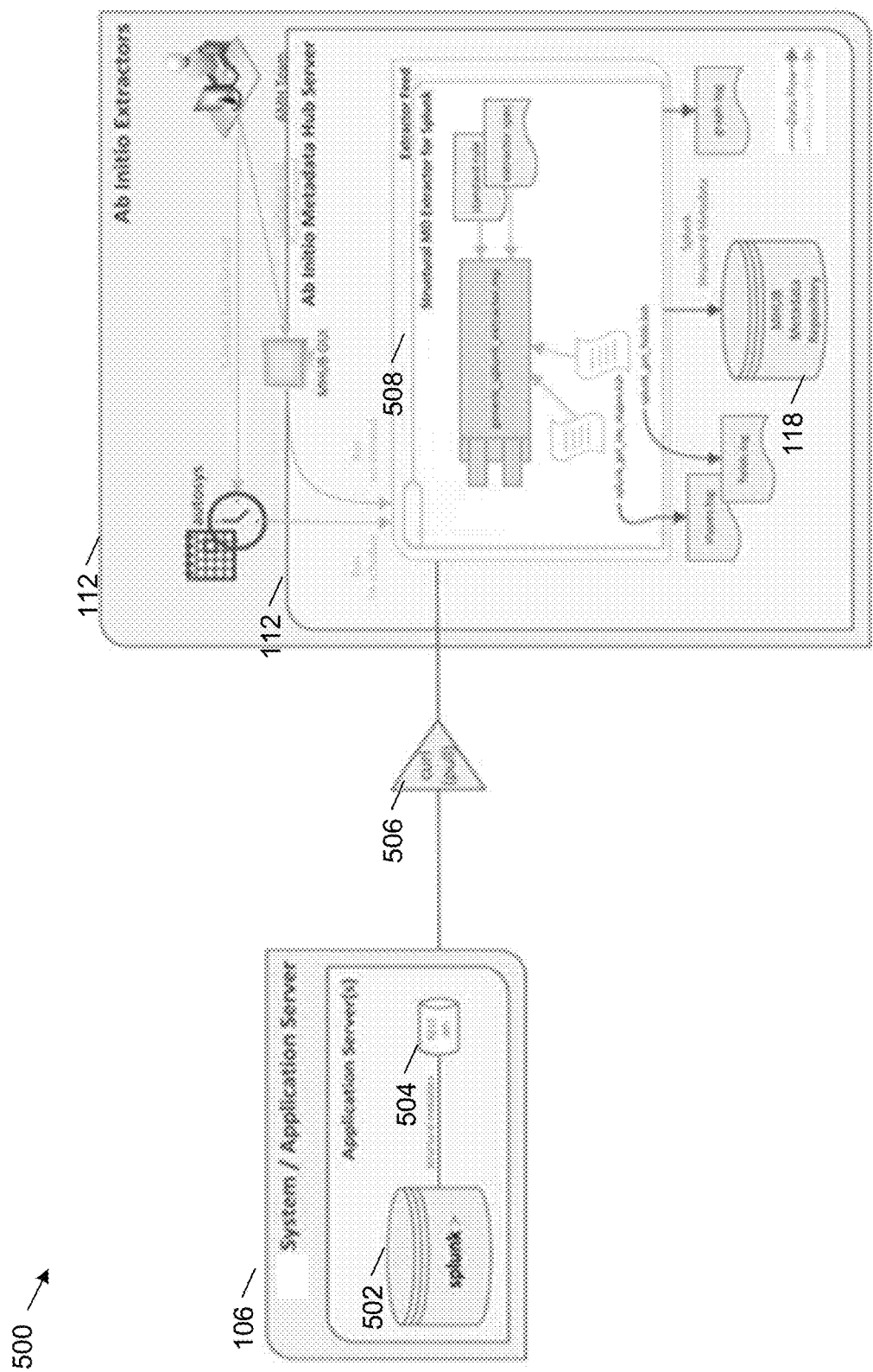
FIG. 5 shows additional example details of another embodiment of the system of FIG. 1.

Referring now to FIG. 5, another example of a system 500 for the programmatic extraction of the metadata from the big data source 106 is shown. In this example, the big data source 106 is a Splunk big data source. The metadata extraction device 112 is programmed to extract the relevant metadata information from the Splunk big data source.

More specifically, the data of the big data source 106 is stored in a database 502. This data can be unstructured or semi-structured. The metadata extraction device 112 uses a connector to invoke functionality associated with the database 502.

Specifically, the metadata is made available to the metadata extraction device 112 via an application programming interface (API) 504. An account (e.g., for running automated processes) is set up to access the API 504 to extract the metadata from the database 502.

The extraction is done through the API 504 by an extraction module 508. The extraction module 508 systematically queries the database 502 for the metadata. This metadata extraction is done in three consecutive passes corresponding to the hierarchical structures in the database 502:

first pass—top hierarchical, to create index: give me all indexes (where index=*) Result (one row)="GenericIndex001" (as shown in the table below);

second pass—source types: give me all SourceTypes, where index=GenericIndex001; Result=GenericIndex: Generic_ST (as shown below); and third pass—fields: give me all fields, where Index=GenericIndex001 and Sourcetype=GenericIndex:Generic_ST (as shown below).

The index is an organization method that is used by the big data source (e.g., Splunk) to provide an overall container for the data. The sourcetype is a default field within the big data source (e.g., Splunk), allowing the big data source to identify from where the data came, describes the type of data, and/or helps formatting of the data (e.g., dates). The fields are the lowest level within the big data source data organization. A field refers to the data stored, such as "Account #123". Fields are the building blocks of searches, reports, and data models within the big data source.

A transport mechanism 506 transfers data to or from the database 502 and the metadata extraction device 112. One example of the transport mechanism 506 is curl, which is a tool to transfer data to and from a data source. In this example, curl uses one of the supported protocols (HTTP, HTTPS, . . . or FILE) to shepherd data. In one example, a shell script is used to accomplish the extraction. The transport mechanism 506 acts as a middle man, passing the query directions and returning the results.

The metadata extraction device 112 then transforms the data, which includes a custom process that is configured to processes the metadata from the API 504. The process is programmed to place the metadata into a format for storage, such as a forward that is readable by Ab Initio.

The metadata extraction device 112 then loads the metadata into the database 118. Initially, a change set is created, reviewed and approved using functionality provided by Ab Initio. Finally, the metadata is published in the database 118 for viewing.

The result is a detailed understanding of the data structures from the big data source 106. One non-limiting example of the collected metadata is provided in the table below. The hierarchical structure includes: hierarchical structure includes: instance, index, sourcetype, and field.

| Type of metadata | Value extracted from Splunk | Native Type (Descriptor for Field) |
| --- | --- | --- |
| Instance name* | Generic Splunk | n/a |
| Index | GenericIndex001 | n/a |
| SourceType | GenericIndex:Generic ST | n/a |
| Field | Action | Null |
| Field | App | Null |
| Field | App:able_to_transfer file | Null |
| Field | App:category | Null |

Figure 6:
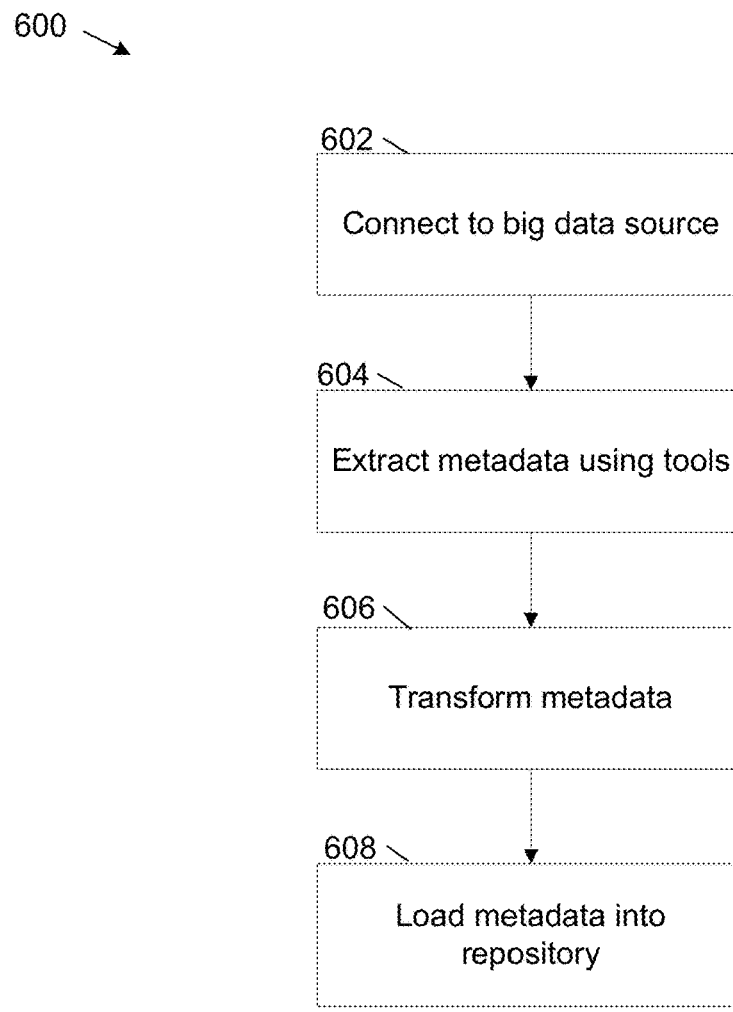
FIG. 6 shows an example method for the programmatic extraction of metadata from big data sources.

Referring now to FIG. 6, an example method 600 is shown for the programmatic extraction of the metadata from the big data source. Generally, the method 600 is performed by the metadata extraction device 112 during metadata extraction.

At operation 602, a connection to the big data source is made. This can be done, for instance, through an API or other mechanism, such as the API 504 for the big data source 106.

Next, at operation 604, the metadata of the big data source is programmatically extracted by the metadata extraction device 112. For example, the extraction module 508 can extract the metadata by systematically querying the database 502 for the metadata using consecutive passes.

At operation 606, the metadata is transformed by the metadata extraction device 112. For example, the extraction module 508 uses the custom process described above to transform the data.

Finally, at operation 608, the extracted metadata is stored in a repository by the metadata extraction device 112. For example, the metadata extraction device 112 loads the metadata into the database 118 for review and approval prior to publication.

Figure 7:
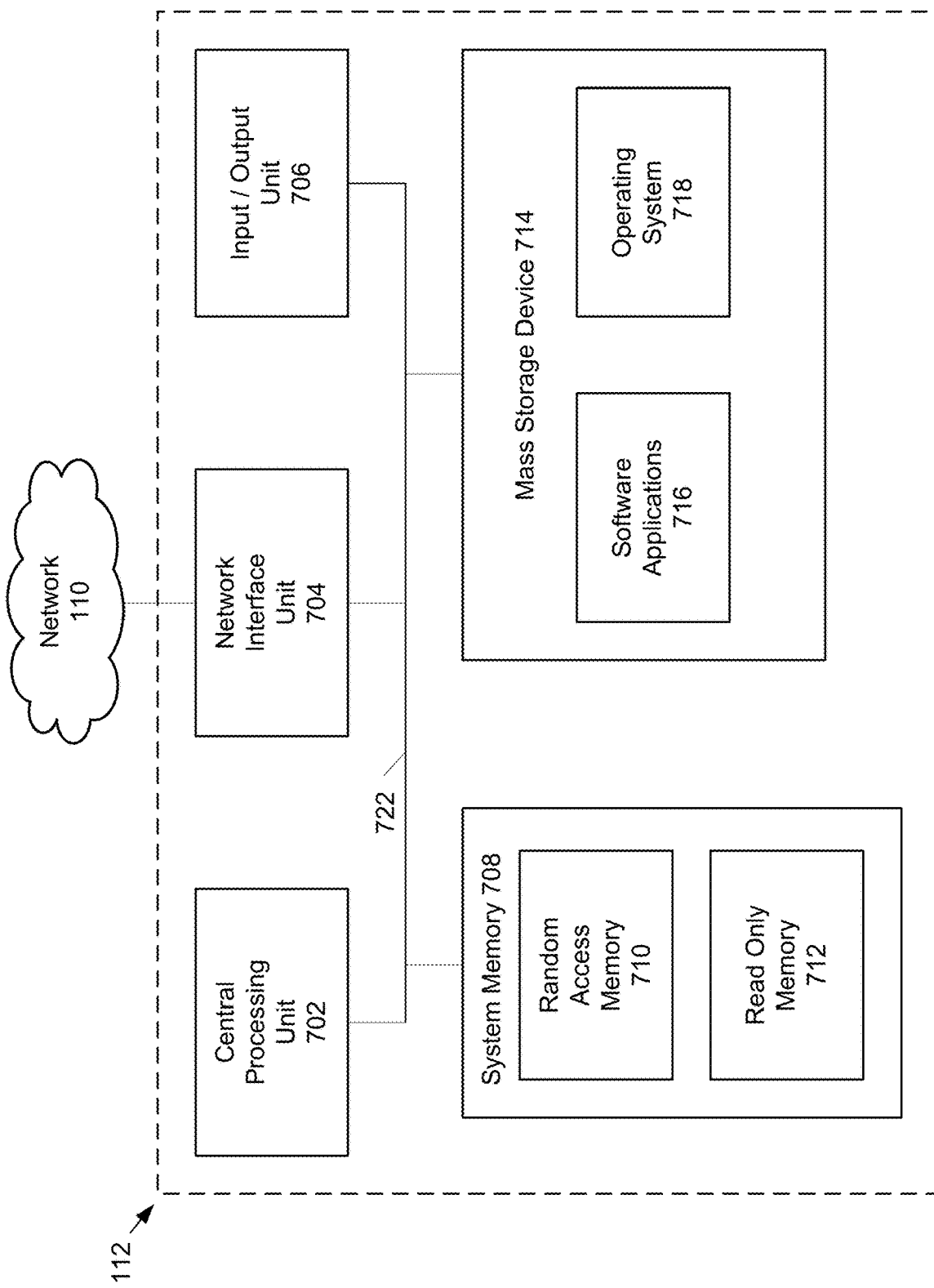
FIG. 7 shows example physical components of the devices of the system of FIG. 1.

As illustrated in the example of FIG. 7, example physical components of the metadata extraction device 112 are shown.

The metadata extraction device 112 includes at least one central processing unit ("CPU") 702, also referred to as a processor, a system memory 708, and a system bus 722 that couples the system memory 708 to the CPU 702. The system memory 708 includes a random access memory ("RAM") 710 and a read-only memory ("ROM") 712. A basic input/output system that contains the basic routines that help to transfer information between elements within the metadata extraction device 112, such as during startup, is stored in the ROM 712. The metadata extraction device 112 further includes a mass storage device 714. The mass storage device 714 is able to store software instructions and data. Some or all of the components of the metadata extraction device 112 can also be included in the other computing components of the system 100.

The mass storage device 714 is connected to the CPU 702 through a mass storage controller (not shown) connected to the system bus 722. The mass storage device 714 and its associated computing device-readable data storage media provide non-volatile, non-transitory storage for the metadata extraction device 112. Although the description of computing device-readable data storage media contained herein refers to a mass storage device, such as a hard disk or solid state disk, it should be appreciated by those skilled in the art that computing device-readable data storage media can be any available non-transitory, physical device or article of manufacture from which the central display station can read data and/or instructions.

Computing device-readable data storage media include volatile and non-volatile, removable and non-removable media implemented in any method or technology for storage of information such as computing device-readable software instructions, data structures, program modules or other data. Example types of computing device-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the metadata extraction device 112.

According to various embodiments, the metadata extraction device 112 may operate in a networked environment using logical connections to remote network devices through the network 110, such as the Internet, or another type of network. The metadata extraction device 112 may connect to the network 110 through a network interface unit 704 connected to the system bus 722. It should be appreciated that the network interface unit 704 may also be utilized to connect to other types of networks and remote computing systems. The metadata extraction device 112 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the metadata extraction device 112 can store software instructions and data. The software instructions include an operating system 718 suitable for controlling the operation of the metadata extraction device 112. The mass storage device 714 and/or the RAM 710 also store software instructions and software applications 716, that when executed by the CPU 702, cause the metadata extraction device 112 to provide the functionality discussed in this document. For example, the mass storage device 714 and/or the RAM 710 can store software instructions that, when executed by the CPU 702, cause the metadata extraction device 112 to extract, transform, and load metadata from a big data source.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system for programmatically extracting data from a big data source, the system comprising:
    a processor; and
    system memory encoding instructions which, when executed by the processor, cause the system to:
        invoke a connector through an application programming interface to access the big data source;
        extract metadata from the big data source using the connector by systematically querying the big data source to perform multiple passes, including to:
            identify indexes in a first pass;
            identify source types in a second pass; and
            identify fields in a third pass;
        transform the metadata into a standard format; and
        load the metadata in a repository.

2. The system of claim 1, wherein the big data source comprises a Splunk big data source.

3. The system of claim 2, wherein the system memory encodes further instructions which, when executed by the processor, cause the system to use an application programming interface of the Splunk big data source to access the metadata.

4. The system of claim 1, wherein the system memory encodes further instructions which, when executed by the processor, cause the system to perform multiple passes to extract the metadata.

5. The system of claim 1, wherein the system memory encodes further instructions which, when executed by the processor, cause the system to use a transport mechanism to transfer data from the big data source.

6. The system of claim 1, wherein the system memory encodes further instructions which, when executed by the processor, cause the system to use curl to transfer data from the big data source.

7. The system of claim 1, wherein the system memory encodes further instructions which, when executed by the processor, cause the system to create a change set in the repository.

8. The system of claim 7, wherein the system memory encodes further instructions which, when executed by the processor, cause the system to publish the metadata in the repository once the change set is approved.

9. A method for programmatically extracting data from a big data source, the method comprising:
    invoking a connector through an application programming interface to access the big data source;
    extracting metadata from the big data source using the connector by systematically querying the big data source to perform multiple passes, including:
        identifying indexes in a first pass;
        identifying source types in a second pass; and
        identifying fields in a third pass;
    transforming the metadata into a standard format; and
    loading the metadata in a repository.

10. The method of claim 9, wherein the big data source comprises a Splunk big data source.

* * * * *